(12) United States Patent
Wang et al.

(10) Patent No.: US 8,626,979 B2
(45) Date of Patent: Jan. 7, 2014

(54) COMMON PROTOCOL ENGINE INTERFACE FOR A CONTROLLER INTERFACE

(75) Inventors: Jennifer C. Wang, Tempe, AZ (US); Nai-Chih Chang, Chandler, AZ (US); Beracoecha Alejandro Lenero, Phoenix, AZ (US); Yew-Kee E. Wong, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 12/975,613

(22) Filed: Dec. 22, 2010

(65) Prior Publication Data

US 2012/0166692 A1    Jun. 28, 2012

(51) Int. Cl.
*G06F 13/36*    (2006.01)

(52) U.S. Cl.
USPC .......................................... 710/315; 709/230

(58) Field of Classification Search
USPC ..................... 710/305–306, 311–315, 62–64; 709/230
See application file for complete search history.

(56) References Cited

U.S. PATENT DOCUMENTS

| | | | |
|---|---|---|---|
| 6,973,516 B1 | 12/2005 | Athanas et al. | |
| 8,112,507 B2 * | 2/2012 | Chang et al. | 709/223 |
| 8,335,883 B2 * | 12/2012 | Tateyama et al. | 710/315 |
| 2003/0229748 A1 | 12/2003 | Brewer et al. | |
| 2009/0113064 A1 | 4/2009 | Yamaki | |
| 2009/0157916 A1 | 6/2009 | Chilukoor et al. | |

OTHER PUBLICATIONS

Search Report dated Sep. 18, 2012.

\* cited by examiner

*Primary Examiner* — Clifford Knoll
(74) *Attorney, Agent, or Firm* — KED & Associates LLP

(57) ABSTRACT

A signal transmission system includes a controller interface, a protocol engine to convert data based on at least one protocol, and a common protocol interface coupled between the controller interface and the protocol engine. The controller interface includes or is coupled to a common dispatcher, and the data is to be transmitted between the controller interface and protocol engine through the common protocol interface and common dispatcher. The same protocol engine may convert data into different protocols, with all of the converted data be transmitted to or received from the controller interface through the common dispatcher and common protocol interface.

21 Claims, 9 Drawing Sheets

COMMON PROTOCOL ENGINE INTERFACE FOR A CONTROLLER INTERFACE

FIELD

One or more embodiments described herein relate to controlling signal transmission.

BACKGROUND

Different communication protocols have been developed in an attempt to standardize the transmission of data between host and peripheral devices. These protocols include the Universal Serial Bus (USB) protocol and the Firewire protocol, as well as others. As newer versions of these standards are developed, existing interface circuits will be unable to operate or must be updated or modified to include customized circuitry and software. This increases cost and complexity and limits usefulness.

DETAILED DESCRIPTION

Figure 1:
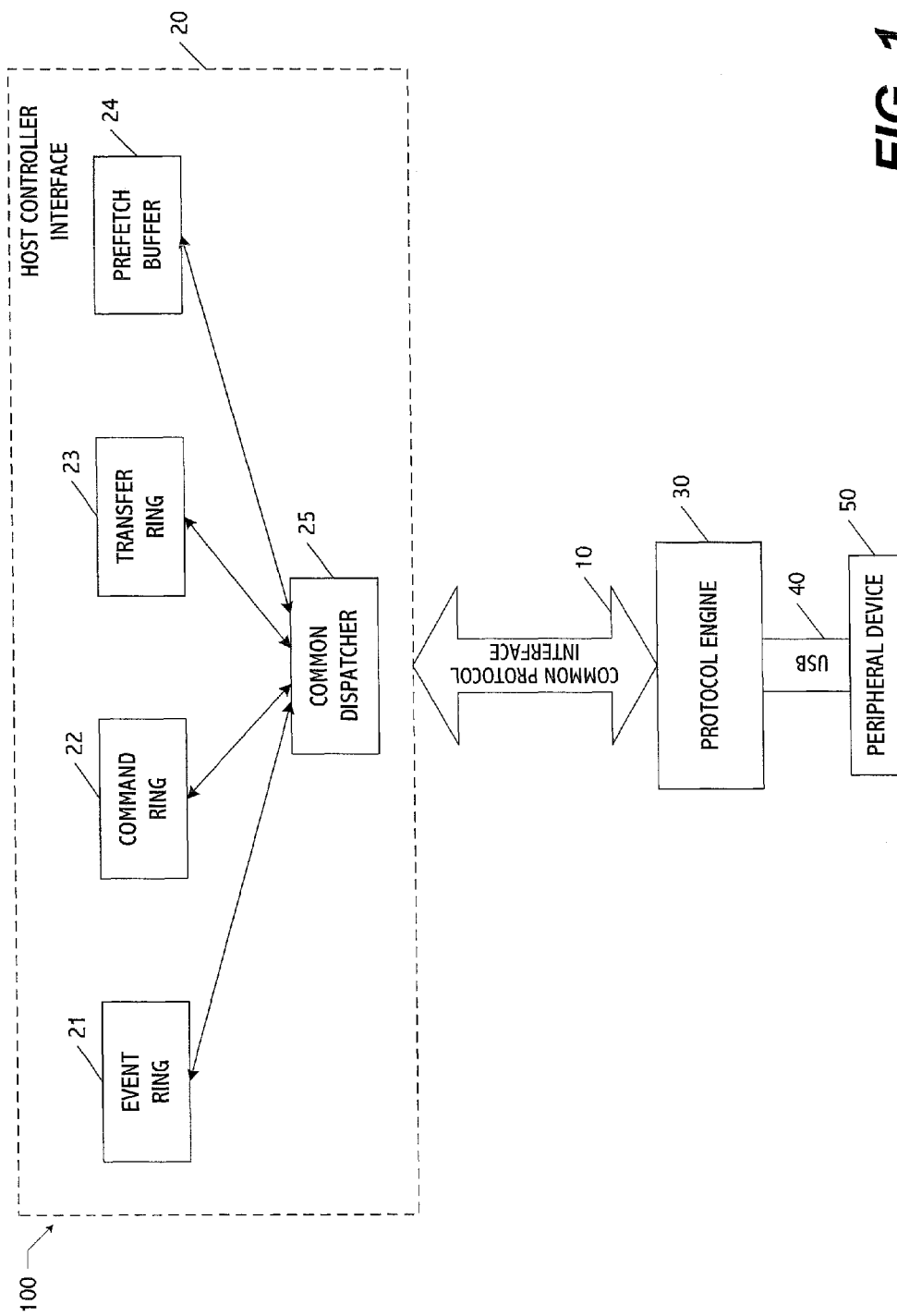
FIG. 1 shows one embodiment of a signal transmission system.

FIG. 1 shows a first embodiment of a signal transmission system 100 which includes a common protocol interface 10 coupled between a host controller interface 20 and a protocol engine 30. The host controller interface 20 may be found within or connected to any one of a number of electronic devices including but not limited to notebook or desktop computers, smart phones, personal digital assistants, music or media players, internet terminals, televisions, monitors, cameras, digital picture frames, and any other device which is to receive and/or transmit signals.

In terms of structure and function, the host controller interface 20 may be controlled by software and/or hardware circuits that controls the timing, format, and flow of signals to be received from and transmitted to the protocol engine through the common protocol interface. The software may be stored, for example, in a host operating system or other memory device included within or coupled to the host controller interface. The host controller interface may be managed by a host controller which executes the software. (While the controller interface is FIG. 1 is described as a host controller, in other embodiments the controller interface may be included in a peripheral or other device, e.g., one coupled to a host device or another device).

As shown in FIG. 1, the host controller interface includes an event ring 21, a command ring 22, and a transfer ring 23. These rings are circular queues of data structures that are used to perform various control and data transfer operations.

The event ring 21 performs the function of reporting various types of information to system software including data transfer and command completion status, root hub port status changes, and other host-controller-related events. The functions of the event ring may be defined in an event ring segment table maintained by the host controller and may operate with one or more enqueue and/or dequeue pointer registers located, for example, in the runtime registers of the controller operating system.

The command ring 22 performs the functions of issuing commands to for performing various control and data transfer operations through protocol engine, configuring the host controller to support peripheral devices coupled to the protocol engine, and coordinating virtualization features. The command ring may be managed based on information in one or more command ring registers included in operational registers of the system.

The transfer ring 23 performs the function of transferring data between system memory buffers and device endpoints. The transfers are performed to and from the endpoint of a peripheral device 50 using a transfer descriptor, which includes one or more transfer request blocks. Transfer descriptors are managed through the transfer ring, which may reside in the memory of the host controller. The peripheral device is coupled to the protocol engine through a cable 40.

In performing the aforementioned functions, the transfer ring may operate based on enqueue and dequeue pointers which define the logical beginning and end of valid entries in the ring. The transfer ring, therefore, may define transfers of transfer descriptors (work items) relating to data between the host controller (coupled to or containing the host controller interface) and the peripheral device endpoint (which may include or be coupled to the protocol engine).

The host computer interface also includes a prefetch buffer 24 which stores a data payload to be transferred to or received from the peripheral device coupled to the protocol engine through the cable. The data transfers are performed based on control operations of the transfer, command, and event rings, all of which are coupled to the common dispatcher 25.

In some designs, different dispatchers are used for specific protocol engines, for example, ones that operate according to different USB specifications and/or speeds. These protocol engines are directly connected to the different rings and prefetch buffer of the host controller interface, and are also connected to different dispatchers included in the interface that operate in accordance with each specific protocols. This architecture increases cost and complexity and limits the host device to transmitting and receiving data only to peripheral devices that comport with those specific protocols.

In the embodiment of FIG. 1, host controller interface 20 has only one dispatcher (labeled a common dispatcher) 25 which can accept commands and transfer and receive data according to multiple protocol standards. The use of one single dispatcher adaptable to a variety of protocol standards is made possible by the common protocol interface 10 and the functions performed by the protocol engine.

The protocol engine 30 may perform the function of packetizing data payloads to multiple specific protocols, so that peripheral devices operating according to different transmission standards can connect to the host device. The common protocol interface 10 carries control signals for those different protocols to enable data transfers between the host and peripheral devices.

More specifically, the common protocol interface allows the protocol engine to connect to peripheral devices operating according to different standards, including, for example, a Universal Serial Bus (USB) standard and/or a Firewire standard. (In another embodiment, the common protocol interface may allow the protocol engine to connect to peripheral devices operating using a single predetermined protocol. The same is true with the common dispatcher, i.e., in alternative embodiments the common dispatcher may operate according to a single predetermined protocol).

The USB protocol has gained increased popularity in recent times. Therefore, for illustrative purposes, the embodiments described herein will described using one or more protocol engines that operate using two or more of a USB 3.0 super speed standard, a USB 2.0 high speed standard, or a USB 2.0 full speed/low speed standard. As such, the host controller interface may be referred to as an eXtensible Host Controller Interface (xHCI). (In other embodiments, instead of a ring structure, the host controller interface may include a plurality of queues or registers. Moreover, while the example of an xHCI controller interface is given, other embodiments may cover other types of controller interfaces to be implemented in the host and/or in the device coupled to the host).

The combination of the common dispatcher, common protocol interface, and protocol engine(s) allow data transfers to take place without requiring the command, transfer, and event rings and prefetch buffer in the host controller interface to directly interact with protocol engine. Instead, the command, transfer, and event rings operate according to a common set of instructions irrespective of the protocol engine transmission standard, and only one common dispatcher 25 is required. As a result, data transfers take place between host and peripheral devices transparently from the standpoint of the host controller interface, thereby reducing cost and complexity.

More specifically, the common dispatcher allows different types of protocol engines (e.g., USB 2.0, USB 3.0, Serial Advanced Technology Attachment (SATA), etc.) to connect to the host controller interface without the need to use specially dedicated dispatchers. For example, use of common dispatcher 25 may allow the same protocol engine to operate as a host device, a peripheral device, or USB On-The-Go (USB OTG) device without having to modify connections between the protocol engine, dispatcher, command, transfer, event rings and the prefetch buffer. Instead, the common dispatcher allows a single interface to be used which is compatible with protocol engines of different standards.

The common dispatcher further allows information between the protocol engine and host controller interface to pass through a single common protocol interface 10, which operates to perform duplex (bidirectional) data transfers and to support different priority of transfers. As will be described in greater detail below, using the common protocol interface will allow, for example, a high-speed USB protocol engine or a super-speed USB protocol engine to interface to the common dispatcher only without any system performance penalty.

Figure 2:
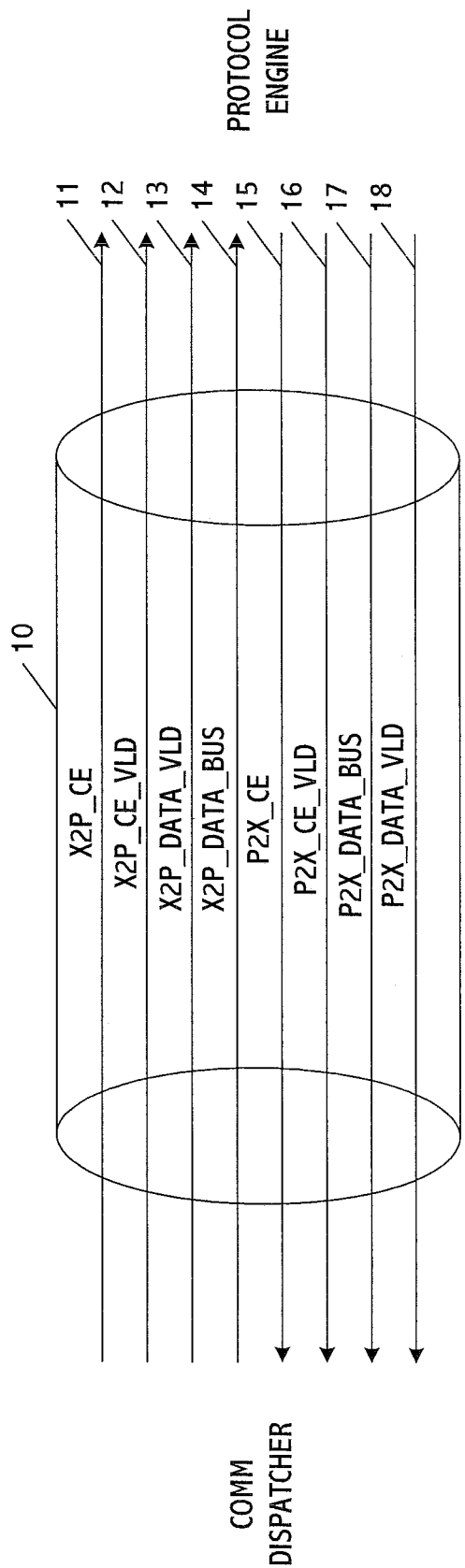
FIG. 2 shows one embodiment of a common signal interface in the system.

Accordance with one embodiment, as shown in FIG. 2, the common protocol interface 10 includes a first bus 11 in the form of an xHCI-to-protocol engine command/event (x2p_ce) bus, a second bus 14 in the form of an xHCI-to-protocol engine data (x2p_data) bus, a third bus 15 in the form of a protocol engine-to-xHCI command/event (p2x_ce) bus, and a fourth bus 17 in the form of a protocol engine-to-xHCI data (p2x_data) bus.

The common protocol interface may also include a number of other signals lines, including an xHCI-to-protocol engine command/event valid (x2p_ce_vld) bus 12, an xHCI-to-protocol engine data valid (x2p_data_vld) bus 13, a protocol engine-to-xHCI command/event valid (p2x_ce_vld) bus 16, and a protocol engine-to-xHCI data valid (p2x_data_vld) bus 18.

As shown, the common protocol interface supports duplex operation, as buses 11 through 14 transmit control signals and data in one direction (from the common dispatcher to the protocol engine) and buses 15 through 18 transmit signals and data in the opposite direction (from the protocol engine to the common dispatcher). The command/event and data valid buses carry control signals for enabling data transfer and the data bus lines carry the data.

The common protocol interface 10 may include a number of other signal lines including, for example, a line for transmitting data attributes such as USB packets, packet class identifiers, packet identifiers, or protocol identifiers. The embodiments described herein are not to be limited to these aforementioned signal lines or data attributes or even to an xHCI implementation. Rather, alternative embodiments may be drawn to other types of protocols or controller interface architectures, and thusly the common protocol interface corresponding to these alternative embodiments may have a different arrangement of bus lines.

Figure 3:
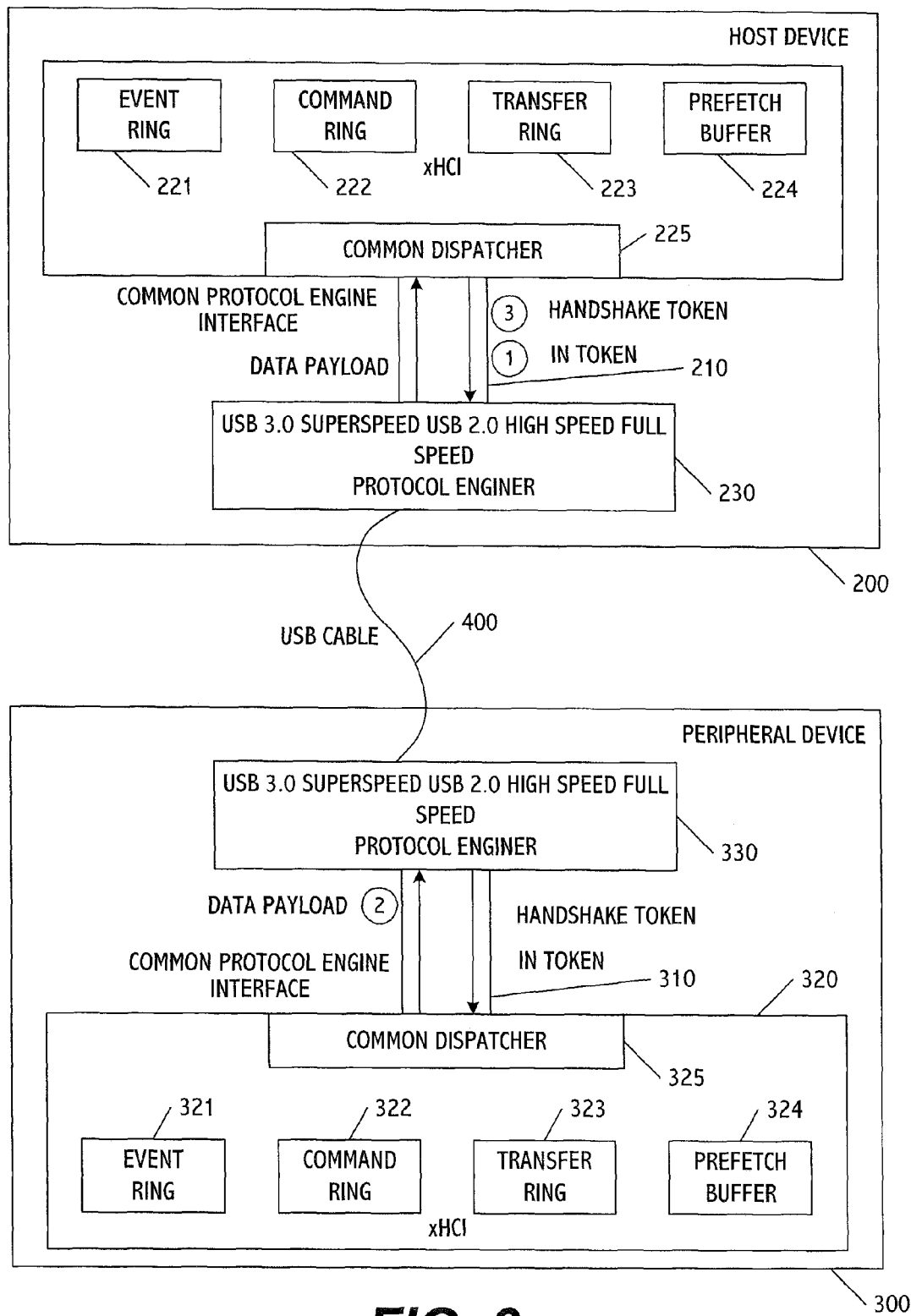
FIG. 3 shows one embodiment of a data-transfer operation in the system.

FIG. 3 shows a cable 400 which carries data between a host device 200 and a peripheral device 300. The host and peripheral devices the same or similar configuration in its front-end circuits, and each may operate in accordance with features of the embodiment in FIGS. 1 and 2.

More specifically, the host device 200 includes a host interface controller 220 that includes event, command, and transfer rings 221, 222, and 223, a prefetch buffer 224, and a common dispatcher 225. The common dispatcher is coupled to protocol engine 230 through common protocol interface 210. The peripheral device includes event, command, and transfer rings 321, 322, and 323, a prefetch buffer 334, and a common dispatcher 325. The common dispatcher is coupled to protocol engine 330 through common protocol interface 310. In this embodiment, each of the protocol engines 230 and 330 support USB 3.0 super speed and USB 2.0 high speed/full speed standards. Accordingly, cable 400 is a compatible USB cable.

Figure 4:
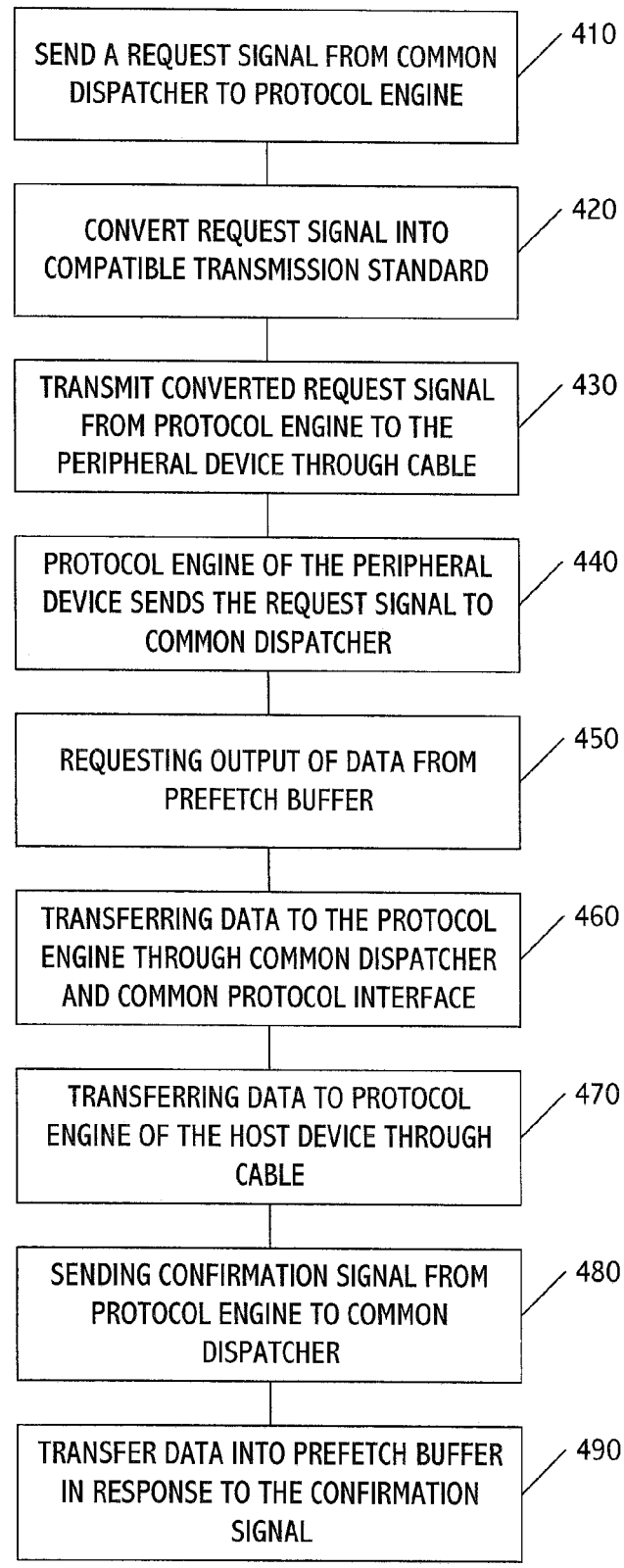
FIG. 4 shows operations included in one embodiment of a method for performing a data transfer operation in a signal transmission system.

In FIG. 3, signal flow is explained for the transfer of data from peripheral device 300 to host device 200, and operations for performing this signal flow are shown in FIG. 4. Initially, the common dispatcher 225 generates and sends a request signal (e.g., IN token) to protocol engine 230 through common protocol interface 210, as shown by signal flow ①. (Block 410). The IN token may be generated in accordance with the transfer ring triggered, for example, by a doorbell after connection of USB cable 400 between the host and peripheral devices and after an enumeration process is completed. Alternatively, the IN token may be generated in response to a command to receive data performed by an operating system of the host device, for example, in response to a user request.

Next, protocol engine 230 converts the IN token into or otherwise generates a control signal that is compatible with the USB 2.0 standard. (Block 420). The protocol engine may generate this standard-compatible control signal, for example, based on an instruction from the host controller interface. That is, the host controller interface may instruct the protocol engine to initiate a USB 2.0 (or other standard in alternative embodiments) transfer.

As a non-limiting example, the cable 400 may be attached and a polling and/or attachment detection process may be performed to determine the speed of the peripheral device. This may be performed using a port status register. Because there is a direct correlation between the speed and a specific standard, the result of the polling process is used to determine the operations of the protocol engine. The foregoing example is provided for a USB 2.0 standard and hence similar terminology may be used. However, other standards may be used in alternative embodiments.

Returning to FIG. 4, the IN token signal is transmitted in its converted form to the peripheral device through the cable (Block 430), where it is received by protocol engine 330 and sent to common dispatcher 325 (Block 440). Upon receiving the IN token, the common dispatcher of the peripheral controller interface 320 requests output of data from the prefetch buffer 324 in accordance with operations performed by event ring 321, transfer ring 322, and command ring 323. (Block 450).

The requested data is transferred from the prefetch buffer to the protocol engine 330 through the common dispatcher 325 and common protocol interface 310, as shown by ② signal flow. (Block 460). The protocol engine 330 then transmits the data on cable 400 to protocol engine 230 (Block 470). When the data is received, a confirmation signal (e.g., handshake token) is sent from the protocol engine to the common dispatcher 225 of the host controller interface 220, as shown by signal flow ③ (Block 480).

Finally, in response to the confirmation signal, the data received by the protocol engine is transferred into the prefetch buffer 224 through the common protocol interface 210 and common dispatcher. (Block 490). This operation may be performed based on the creation of an event in event ring 221, a command in the command ring 222, and a transfer work item in the transfer ring 223, the latter of which instructs the common dispatcher to receive the data from the protocol engine for storage in the prefetch buffer.

The foregoing operations may be performed in the case where the data transfer occurs in accordance with a USB 2.0 standard. For a USB 3.0 data transfer, similar operations are performed except that the IN token and handshake token are replaced with respective acknowledgement (ACK) transaction packets. Irrespective of which standard is used, the timing diagrams used to control the signal flow through common protocol interfaces 210 and 310 may be the same.

Figure 5:
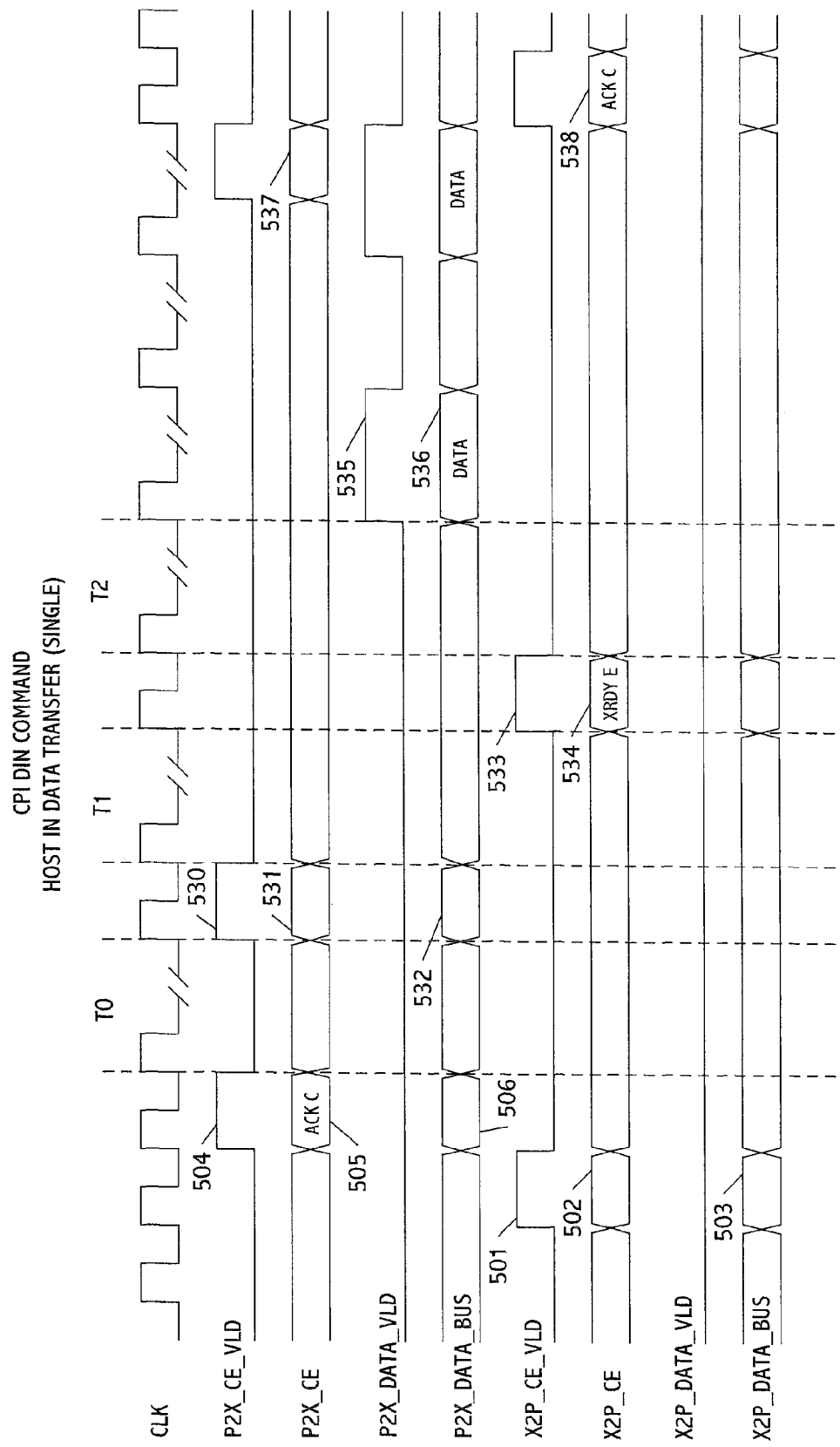
FIG. 5 shows a first timing diagram for performing a data transfer operation.

FIG. 5 shows a timing diagram for performing data transfer operations in the host device, relating to FIGS. 3 and 4. As shown, to start the data transfer cycle, the common dispatcher 225 of the host device asserts the x2p_ce_vld signal 501 high for one clock cycle. When this signal is asserted, the command/event type is designated as a host device-to-protocol device transfer. In this example, the command type may correspond to a DIN_C signal 502 and the current IN transaction target device may correspond to the x2p_data_bus signal 503.

At this time, the protocol engine 230 of the host device will acknowledge this transfer by asserting the p2x_ce_vld signal 504 high for one clock cycle in the next clock cycle based on acknowledge command 505, ACK_C, on the p2x_ce line. The target device information corresponds to the p2x_data_bus signal 506. Protocol engine 230 will use an IN token from USB 2.0 or an ACK packet for USB 3.0 to control downstream of data to the USB peripheral device.

Figure 6:
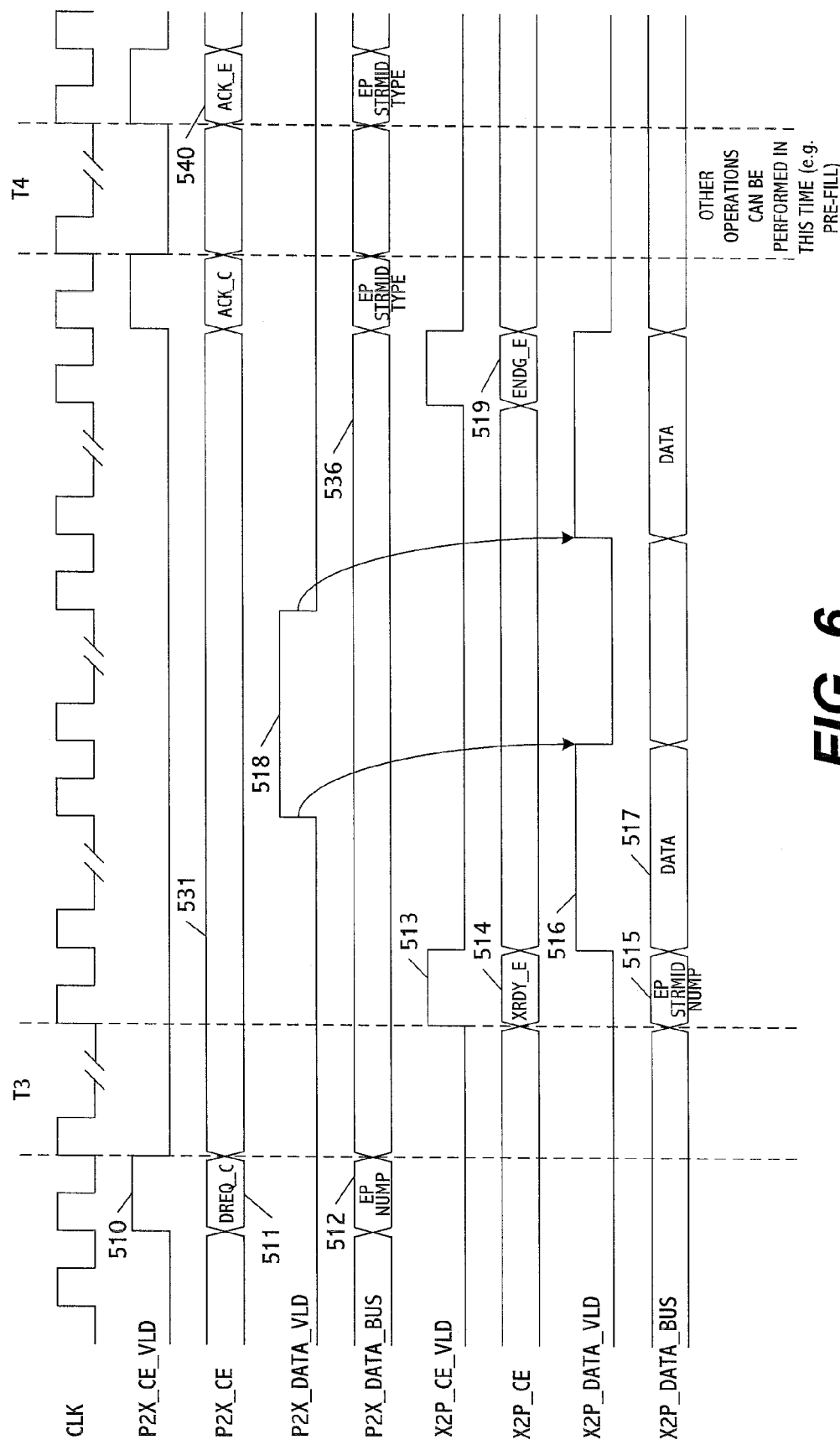
FIG. 6 shows a second timing diagram for performing a data transfer operation.

FIG. 6 shows a timing diagram for controlling operations in the peripheral device in connection with the data transfer in FIG. 5. As shown in FIG. 6, when the protocol engine of the peripheral device receives the IN token, it will assert the p2x_ce_vld signal 510 high for one clock cycle. When this signal is high, the command DREQ_C (Data request) 511 is generated and end point information 512 is asserted in the p2x_data_bus.

In FIG. 6, period T3 corresponds to a latency time for common dispatcher 325 in the peripheral device to process command information and access data payload information in prefetch buffer 324. When the data is ready to be output from the buffer, common dispatcher 325 will assert the x2P_ce_vld signal 513 high for one clock cycle. Also, an XRDY_E event signal 514 is asserted in the x2p_ce bus and end point information is placed on the x2p_data_bus 515. One clock cycle later, the common dispatcher 325 of the peripheral device asserts the x2p_data_vld signal 516 high and the data 517 is transferred on the x2p_data_bus.

The protocol engine 330 throttles the data transfer rate by de-asserting p2x_data_vld signal 518 to high to stop the data transfer for a certain period of time (indicated by the arrows), in order for the data to be properly received. The p2x_data_vld signal may then be de-asserted to transmit remaining packets of the data. The protocol engine 330 will continue to send the data back to the host device along the cable until the end of the data payload (indicated by ENDx_E event 519) is generated by the common dispatcher 325 on the x2p_ce bus. This marks the end of the data transfer operation. During a period T4, other operations may be performed such as, for example, a pre-fill operation. (In another embodiment, the data transfer rate may be throttled by the protocol engine by requesting a smaller packet size, e.g., by a partial data transaction).

Referring back to FIG. 5, period T0 is a latency time between when the IN token is issued to protocol engine 230 of the host device and when the protocol engine of the host device actually receives the data payload from the peripheral device through the USB cable. After T0, the protocol engine 230 of the host device asserts the p2x_ce_vld signal 530 high for one clock cycle, and a DINE event 531 is asserted in the x2p_ce along with target information 532 on the p2x_data_bus.

Period T1 is a latency time for common dispatcher 225 of the host device to process the DIN_E event and allow the protocol engine 230 to start writing to prefetch buffer 224. After T1, common dispatcher 225 asserts an x2p_ce_vld signal 533 high for one clock cycle and an XRDY_E event 534 is sent to the common dispatcher. The protocol engine of the host device will then assert the p2x_data_vld signal 535 high to enable data 536 to be transferred to the common dispatcher along the p2x_data_bus.

At the end of the data transfer, the protocol engine will assert an ENDx_E event 537 and the common dispatcher of the host device will then generate an ACK_C signal 538 to acknowledge the ENDx_E event, which indicates whether x is either good or bad. Then, the protocol engine of the host device will send a handshake token 539 based on the ENDx_E. For USB2.0, ENDG_E will generate an ACK token and an ENDB_E event will generate a NACK token. For USB 3.0, ENDG_E will generate an ACK signal, an ENDB_E event will generate a Retry packet. Assuming that the device receives a successful handshake token, an ACK_E event (signal 540 in FIG. 6) will be generated in the common protocol interface to signal the end of the IN transfer.

For an OUT transfer, the timing for the common protocol interface for the host device is similar to the IN transfer. The host device will initiate the start of an OUT transfer by asserting the x2p_ce_vld signal high for one clock cycle and issue a DOUT_C command on the x2p_ce and target device information on the x2p_data_bus. The protocol engine of the host device will generate an ACK_C event to acknowledge this OUT token request. When the protocol engine is ready, it will assert the p2x_ce_vld signal high for one clock cycle and issue a DREQ_C command on the x2p_ce bus and the target device information on the x2p_data_bus.

After the DRE_C command, all the data transfer time will be similar to the device IN data transfer timing. When the protocol engine of the peripheral device receives the OUT token and the data payload, it will assert the p2x_ce_vld signal high for one clock cycle and issue a DIN_E event on the p2x_ce bus and endpoint information on the p2x_data_bus. After the DINE event, the device timing will follow the Host IN data transfer timing diagram.

Figure 7:
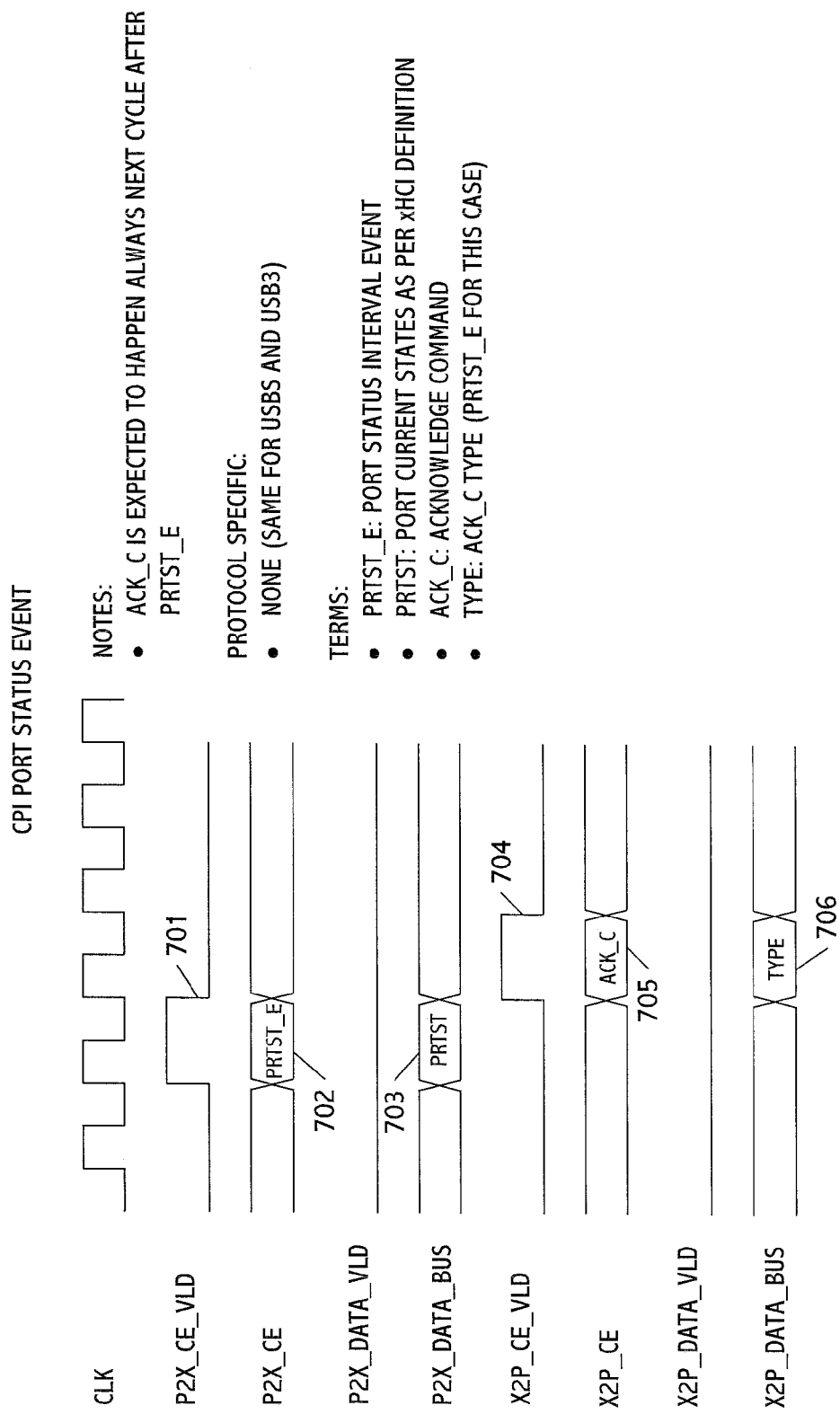
FIG. 7 shows a third timing diagram for processing a Port Status Event.

FIG. 7 shows a timing diagram for an embodiment where the protocol engine reports a port state change (e.g., disconnect or low power state entering/exiting). In this case, the protocol engine asserts a p2x_ce_vld signal 701 high for one clock cycle. When the p2x_ce_vld signal goes high, the command/event type (PRTST_E) 702 is the p2x_ce. In this example, the event type is a port status Event and current port state information 703 is placed on the p2x_data_bus. The common dispatcher will acknowledge this transfer by asserting the x2p_ce_vld signal 704 high for one clock cycle in the next clock cycle, and the acknowledge command 705 (ACK_C) and the acknowledge type as a Port status Event 706. The common dispatcher will notify appropriate blocks (event ring, transfer ring, and command ring) to enable this operation to be performed in the host controller interface.

Figure 8:
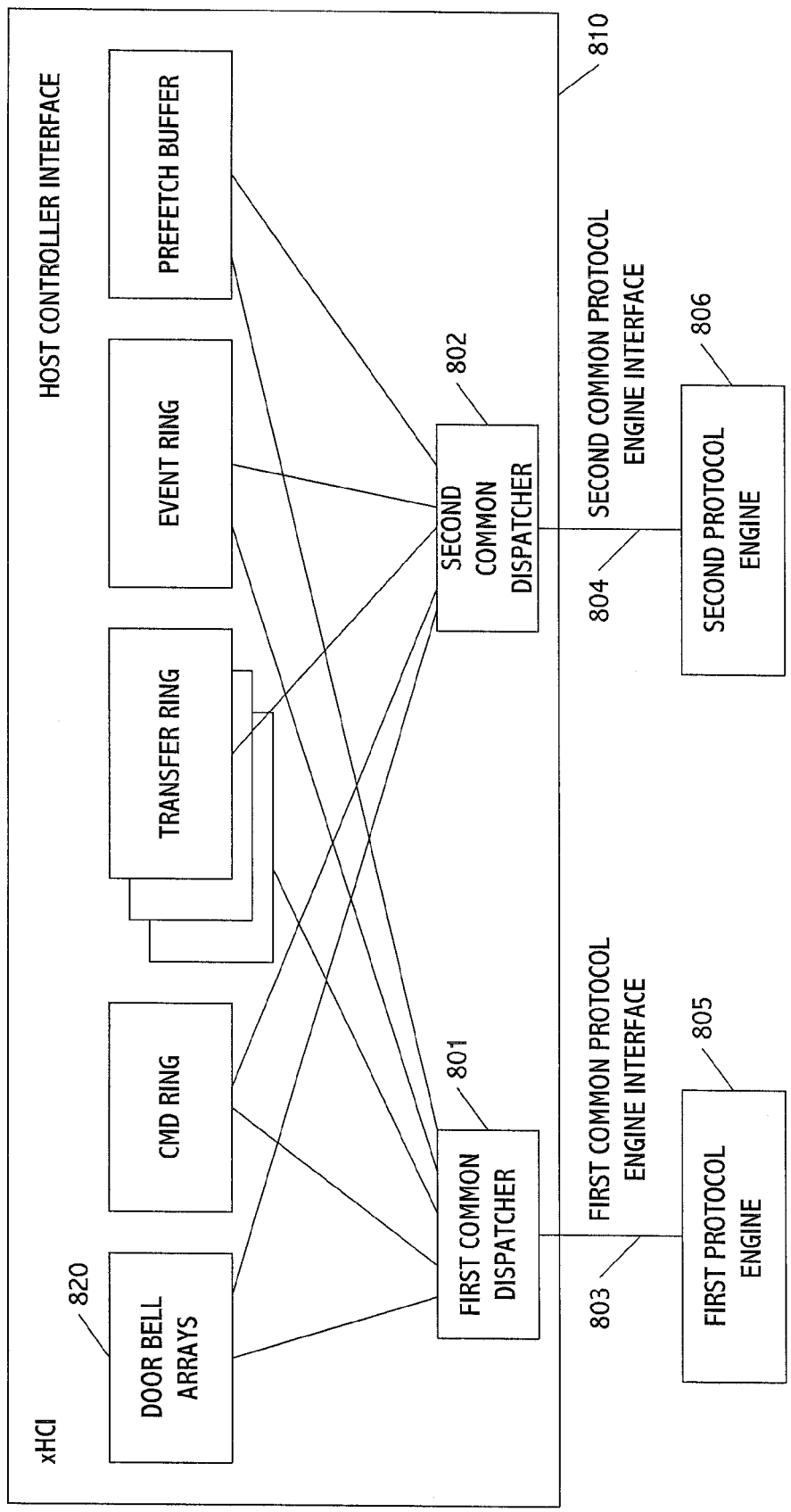
FIG. 8 shows another embodiment of a signal transmission system.

Numerous other commands (C) and events (E) may be performed by the common protocol signal interface of the aforementioned embodiments. These command and events include:
  SETUP_E
  SETUP_C
  STATUS_IN_E
  STATUS_OUT_E
  STATUS_IN_C
  STATUS_OUT_C
  PING_C
  NYET_C
  XRDY+E
  TIMEOUT_E
  STALL_E FIG. 8 shows another embodiment of a signal transmission system 800 which is similar in construction to the embodiment in FIGS. 1 and 3 except that the FIG. 8 embodiment uses two common dispatchers, namely a first common dispatcher 801 and a second common dispatcher 802. These dispatchers are coupled to respective first and second protocol engines 805 and 806 through corresponding first and second common protocol interfaces 803 and 804. Protocol engine 805 is a USB 2.0 high speed/full speed engine and protocol engine 806 is a USB 3.0 super speed engine. Different peripheral devices may be coupled to the protocol engines using separate USB cables to perform data transfer operations.

The common dispatchers, common protocol interfaces and protocol engines operate independently from one another and in a similar manner as the embodiments of FIGS. 1 and 3, with one exception. In addition to the command, transfer, and event rings and a prefetch buffer, the host controller interface 810 (e.g., an xHCI) includes one or more door bell arrays 820 which operate to set a work available flag for respective ones of the common dispatchers, to enable/activate a dispatcher to send or receive data to a peripheral device connected to a corresponding one of the protocol engines.

Figure 9:
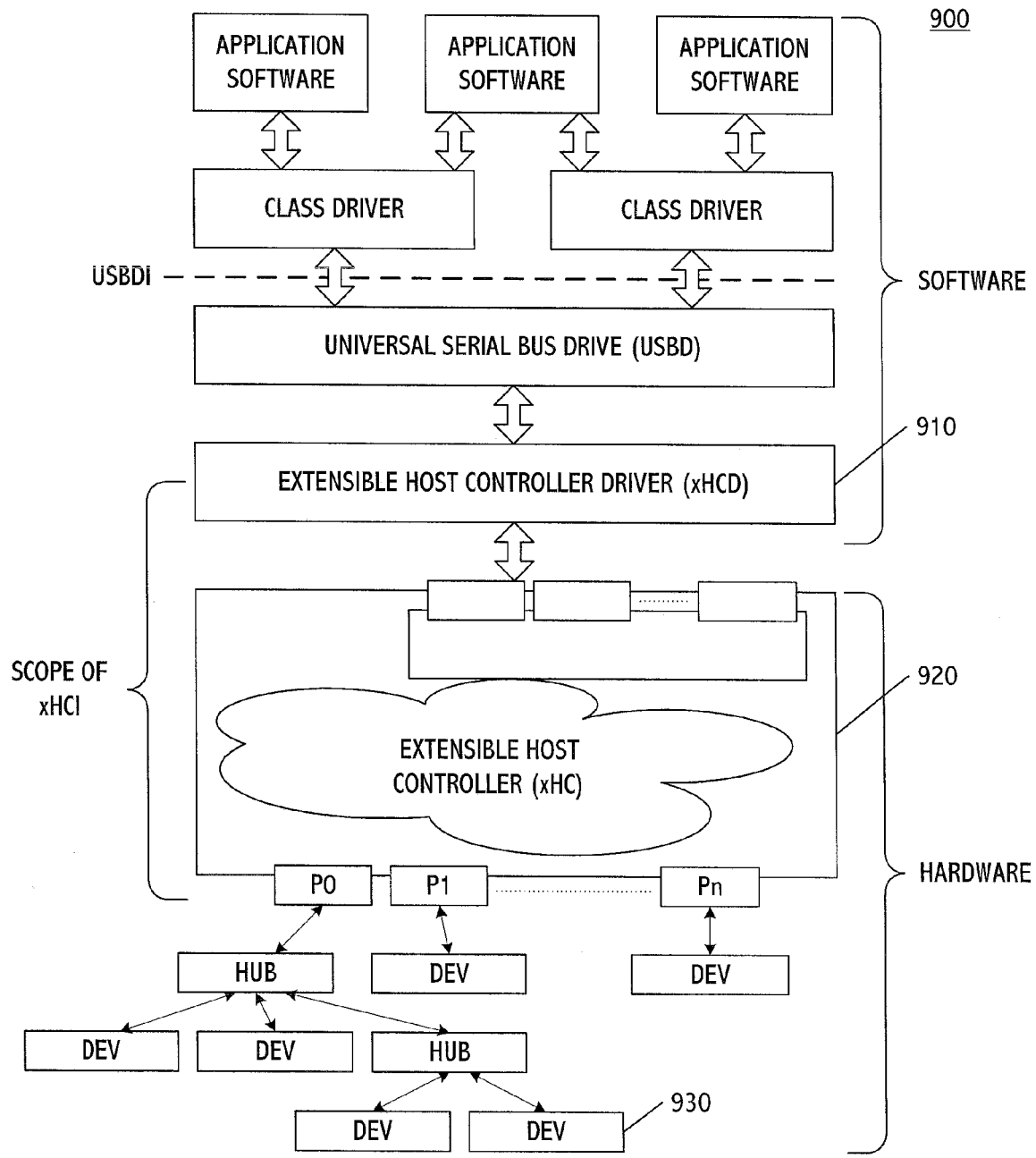
FIG. 9 shows one embodiment of a host device that includes a host controller and host controller interface.

FIG. 9 shows an example of a signal transmission system 900 which includes a software and hardware implementation of a USB xHCI driver 910 for driving operations of an xHCI host controller interface 920 in accordance with any one of the embodiments of the signal transmission systems described herein. In the system of FIG. 9, the xHCI software drivers manage and control operations of the host controller interface in transferring data to and receiving data from a peripheral device 930, which is either directly connected to the host device or connected to the host device though a hub arrangement or network.

As indicated, the signal transmission systems described herein may be controlled by a combination of software and hardware. Accordingly, a computer-readable medium may be provided to store instructions for controlling performance of a data transfer operation. The medium may be included within or coupled to the host controller interface or host controller, and/or may be included as part of an operating system of the host device.

In one embodiment, the instructions may include a first set of instructions to initiate transfer of data from a host device to a peripheral device and a second set of instructions to transfer data from a prefetch buffer to the common protocol interface. The data to be transferred from the prefetch buffer to the common protocol interface is passed through a common dispatcher included within or coupled to the host controller interface.

Additionally, the second set of instructions control the data to be transferred to the peripheral device through a protocol engine coupled to the common protocol interface, with the protocol engine converting the data into one of a plurality of protocol standards. The protocol standards may be different USB protocol standards and/or may cause the data to be transferred at different speeds.

Additionally, a third set of instructions may be included to control sending of control signals between the common dispatcher and at least one of a control ring, transfer ring, or command ring included in the host controller interface. The control signals may control transfer of the data from the prefetch buffer to the common dispatcher.

In the foregoing embodiments, the term protocol engine is specifically used. However, this feature is intended to cover any circuit, software, or combination therefore that performs a data conversion function as described herein.

While the aforementioned embodiments have been described for USB 2.0 and USB 3.0 standards, the embodiments should not be limited to these standards. At the same time, the common protocol engine in the foregoing embodiments allows USB 2.0 and USB 3.0 data transfers to be transparent to the host controller interface (xHCI). All the underlying protocols are handled in the protocol engines, and the responsibility of the common dispatcher is to process the transfer request blocks, including the commands sent to the host controller, events generated by the host controller, and transactions performed by the USB endpoints. The common protocol may also allow a peripheral device, host device, or on-the-go device protocol engine to interface with the common dispatcher without changing interface signals.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. A signal transmission system, comprising:
   a controller interface;
   a common protocol interface;
   a protocol engine to convert data based on at least one protocol; and
   a common dispatcher to accept commands, and to transfer and receive data according to any one of a plurality of communication protocols standards, the common protocol interface to couple between the common dispatcher and the protocol engine, wherein the data is to be transmitted between the controller interface and the protocol engine through the common protocol interface and through the common dispatcher such that data is to be provided from the common protocol interface to the common dispatcher.

2. The system of claim 1, wherein the protocol engine is to convert the data into one of the plurality of communication protocol standards.

3. The system of claim 2, wherein the protocol engine is to convert the data into a Universal Serial Bus (USB) standard.

4. The system of claim 2, wherein the data is to be transmitted across the common protocol interface between the controller interface and the protocol engine irrespective of which communication protocol standard corresponds to the data.

5. The system of claim 2, wherein the plurality of communication protocol standards are different Universal Serial Bus (USB) protocol standards.

6. The system of claim 2, wherein the plurality of communication protocol standards are to transmit the data at different speeds.

7. The system of claim 1, wherein the controller interface includes:
   a prefetch buffer,
   wherein the data from the common protocol interface is to be transmitted for storage into the prefetch buffer through the common dispatcher.

8. The system of claim 1, wherein controller interface includes:
   an event ring, a transfer ring, and a command ring,
   wherein control signals to control transmission of the data are to pass between the common protocol interface and one or more of the event ring, the transfer ring, or the command ring, and the control signals are to pass through the common dispatcher,
   wherein control signals to control transmission of the data are to pass between the common protocol interface and one or more of the event ring, the transfer ring, or the command ring, and the control signals are to pass through the common dispatcher.

9. The system of claim 1, wherein the common protocol interface includes:
   a first signal line to transfer the data from the common dispatcher to the protocol engine;
   a second signal line to transfer additional data from the protocol engine to the common dispatcher; and
   at least one control signal line to control data transfers on the first and second signal lines.

10. The system of claim 1, wherein the controller interface is an extensible host controller.

11. A signal transmission system, comprising:
    a controller interface;
    a first protocol engine to convert first data based on a first protocol;
    a second protocol engine to convert second data based on a second protocol;
    a first protocol interface;
    a second protocol interface;
    a first common dispatcher; and
    a second common dispatcher, the first protocol interface to couple between the first common dispatcher and the first protocol engine, and the second protocol interface to couple between the second common dispatcher and the second protocol engine, wherein the first data is to be transmitted between the controller interface and the first protocol engine through the first protocol interface and the first common dispatcher such that data is provided from the first protocol interface to the first common dispatcher, and the second data is to be transmitted between the controller interface and the second protocol engine through the second protocol interface and the second common dispatcher such that data is provided from the second protocol interface to the second common dispatcher.

12. The system of claim 11, wherein the first and second protocols are different Universal Serial Bus (USB) protocol standards.

13. The system of claim 11, wherein the first and second protocols are to perform data transfers at different speeds.

14. The system of claim 11, wherein the first common dispatcher and the first protocol interface are to operate independently from the second common dispatcher and the second protocol interface to perform different data transfer operations for the first and second data respectively.

15. The system of claim 11, wherein the controller interface includes:
    a prefetch buffer,
    wherein the first data from the first protocol interface is to be transmitted for storage into the prefetch buffer through the first common dispatcher, and the second data from the second protocol interface is to be transmitted for storage into the prefetch buffer through the second common dispatcher, the first and second common dispatchers to operate independently from one another to perform data transfer operations based on the first and second data respectively.

16. The system of claim 11, wherein the controller interface includes:
    an event ring, a transfer ring, and a command ring,
    wherein control signals to control transmission of the first data are to pass between the first protocol interface and one or more of the event ring, the transfer ring, or the command ring through the first common dispatcher, and wherein control signals to control transmission of the second data are to pass between the second protocol interface and one or more of the event ring, the transfer ring or the command ring through the second common dispatcher.

17. A computer-readable medium to store instructions for controlling performance of a data transfer operation, the instructions including:
   a first set of instructions to initiate transfer of data from a host device to a peripheral device, the host device to include a host controller interface, a common protocol interface and a protocol engine, the host controller interface to include a common dispatcher, the common protocol interface to couple between the common dispatcher and the protocol engine, and the data is to be transferred between the controller interface and the protocol engine through the common protocol interface and the common dispatcher such that data is provided from the common dispatcher to the common protocol interface; and
   a second set of instructions to transfer data from a prefetch buffer to the common protocol interface, the data to be transferred from the prefetch buffer to the common protocol interface through the common dispatcher.

18. The computer-readable medium of claim 17, wherein the second set of instructions are to control the data to be transferred to the peripheral device through a protocol engine, the protocol engine converting the data into one of a plurality of protocol standards.

19. The computer-readable medium of claim 18, wherein the protocol standards are different USB protocol standards.

20. The computer-readable medium of claim 18, wherein the protocol standards are to cause the data to be transferred at different speeds.

21. The system of claim 1, wherein the common dispatcher is to be provided at the controller interface to receive data from the common protocol interface, and the common dispatcher to provide data away from the controller interface to the common protocol interface.

* * * * *